United States Patent
Van Handel et al.

(10) Patent No.: US 7,955,671 B2
(45) Date of Patent: Jun. 7, 2011

(54) CRUSH-RESISTANT DISPOSABLE LID AND CONTAINERS UTILIZING SAME

(75) Inventors: Gerald J. Van Handel, Neenah, WI (US); Margaret P. Hoks, Neenah, WI (US); Mark B. Littlejohn, Appleton, WI (US); Kevin E. Lutz, Jr., Laureldale, PA (US); John A. C. Kohout, Fleetwood, PA (US); Rebecca E. Whitmore, Chilton, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 1009 days.

(21) Appl. No.: 11/051,100

(22) Filed: Feb. 4, 2005

(65) Prior Publication Data

US 2005/0145638 A1 Jul. 7, 2005

Related U.S. Application Data

(63) Continuation-in-part of application No. 10/170,675, filed on Jun. 13, 2002, application No. 11/051,100, which is a continuation-in-part of application No. 10/151,558, filed on May 20, 2002, now abandoned, which is a continuation-in-part of application No. 10/068,924, filed on Feb. 8, 2002, now Pat. No. 7,258,905, which is a continuation-in-part of application No. 09/921,264, filed on Aug. 2, 2001, now Pat. No. 6,733,852.

(60) Provisional application No. 60/305,225, filed on Jul. 13, 2001, provisional application No. 60/223,209, filed on Aug. 4, 2000.

(51) Int. Cl.
*B65D 41/16* (2006.01)
*B65D 39/00* (2006.01)

(52) U.S. Cl. ............... 428/35.7; 428/34.1; 428/36.6; 220/780; 220/790

(58) Field of Classification Search ............ 428/34.1, 428/35.7, 36.5, 36.6, 36.8; 220/4.21–4.23, 220/4.26, 4.27, 23.86, 780, 781, 784, 790; 206/501, 509, 512
See application file for complete search history.

(56) References Cited

U.S. PATENT DOCUMENTS 2,630,237 A 3/1953 Rosenlof
(Continued)

FOREIGN PATENT DOCUMENTS

JP 53-84044 7/1978
(Continued)

OTHER PUBLICATIONS

Table 1—Dimension of Commercial Lidded Products.
(Continued)

*Primary Examiner* — Walter B Aughenbaugh
(74) *Attorney, Agent, or Firm* — William W. Letson

(57) ABSTRACT

A domed lid 12 for a food container 10 is configured for ease of engagement and removal from a container base 14. The lid characteristically includes: (a) a dome portion 16 with a top wall 24 and a sidewall 26; (b) a flange portion 28 extending outwardly away from a lower portion of the sidewall; and (c) a tab portion 30 extending outwardly from the flange. The flange portion is provided with a rim 32 having a variable profile around the rim characterized in that: (i) the rim is provided with a securing undercut portion 36 extending around the majority of its periphery adapted to secure the lid to an outer border of base 14; and (ii) the rim has a pair of relatively passive engagement profile portions 42, 44 on either side of tab 30, extending to the securing undercut portion of the rim, the passive engagement profile portions are configured so that they are undercut less than the securing undercut portion of the lid, thereby facilitating engagement of the lid with, or removal of the lid from, base 14.

14 Claims, 8 Drawing Sheets

U.S. PATENT DOCUMENTS

| | | | |
|---|---|---|---|
| 2,811,152 A | 10/1957 | Wicks | |
| 2,914,104 A | 11/1959 | Jocelyn | |
| D195,699 S | 7/1963 | Bostrom | |
| 3,107,027 A | 10/1963 | Hong | 220/23.8 |
| 3,303,964 A | 2/1967 | Luker | 220/97 |
| 3,633,785 A | 1/1972 | Cyr et al. | 220/20 |
| 3,690,902 A | 9/1972 | Dahl | 99/172 |
| 3,938,688 A | 2/1976 | Ryan | 220/23.8 |
| 4,505,962 A | 3/1985 | Lu | |
| 4,555,043 A | 11/1985 | Bernhardt | |
| 4,559,388 A | 12/1985 | Liu et al. | |
| 4,700,842 A | 10/1987 | Grusin | |
| 4,741,452 A | 5/1988 | Holzkopf | |
| 4,776,459 A | 10/1988 | Beckerman et al. | 206/45.32 |
| 4,874,083 A | 10/1989 | Antoni et al. | 206/45.32 |
| 4,911,978 A * | 3/1990 | Tsubone et al. | 428/317.9 |
| 4,960,639 A | 10/1990 | Oda et al. | |
| 5,023,286 A | 6/1991 | Abe et al. | |
| 5,220,999 A | 6/1993 | Goulette | |
| 5,269,430 A * | 12/1993 | Schlaupitz et al. | 220/4.23 |
| 5,287,959 A | 2/1994 | Hansen et al. | 206/45.32 |
| D345,912 S | 4/1994 | Krupa | D9/429 |
| 5,377,860 A * | 1/1995 | Littlejohn et al. | 220/790 |
| D358,091 S | 5/1995 | Warburton | D9/429 |
| 5,427,266 A | 6/1995 | Yun | |
| 5,441,166 A | 8/1995 | Lucas, Jr. et al. | 220/306 |
| 5,573,693 A * | 11/1996 | Lorence et al. | 219/730 |
| 5,685,453 A | 11/1997 | Goins et al. | 220/782 |
| 5,860,549 A | 1/1999 | Allers et al. | 220/4.23 |
| 5,915,581 A | 6/1999 | Pfirrmann, Jr. et al. | 220/4.21 |
| D415,024 S | 10/1999 | McCann | D9/429 |
| D450,580 S | 11/2001 | Littlejohn et al. | D9/429 |
| 6,325,234 B1 | 12/2001 | Legaspi | |
| 6,440,509 B1 * | 8/2002 | Littlejohn et al. | 428/35.7 |
| 6,595,366 B1 | 7/2003 | Brown | 206/551 |
| 6,733,852 B2 | 5/2004 | Littlejohn et al. | 428/35.7 |
| 7,823,746 B1 | 11/2010 | McCumber | |
| 2002/0037378 A1 | 3/2002 | Littlejohn et al. | |
| 2002/0122907 A1 | 9/2002 | Whitmore et al. | 428/35.7 |
| 2002/0175164 A1 | 11/2002 | Dees et al. | |
| 2002/0175171 A1 | 11/2002 | Stewart et al. | 22/781 |
| 2005/0145638 A1 | 7/2005 | Van Handel et al. | |

FOREIGN PATENT DOCUMENTS

| | | |
|---|---|---|
| JP | 59-209520 | 11/1984 |

OTHER PUBLICATIONS

Encyclopedia of Materials Science and Engineering, vol. 3, pp. 1745-1759, MIT Press, Cambridge, MA (1986).

Encyclopedia of Polymer Science & Engineering (2d Ed.), vol. 6; pp. 383-522, Wiley 1986.

J. L. Throne, Thermoforming, published 1987 by Coulthard. pp. 21-29.

* cited by examiner

CRUSH-RESISTANT DISPOSABLE LID AND CONTAINERS UTILIZING SAME

CLAIM FOR PRIORITY

This application is a continuation-in-part of copending U.S. patent application Ser. No. 10/170,675 filed Jun. 13, 2002 which was based upon U.S. Provisional Patent Application Ser. No. 60/305,225, filed Jul. 13, 2001, of the same title. This application is also a continuation-in-part of U.S. patent application Ser. No. 10/151,558 filed May 20, 2002 now abandoned which was a continuation-in-part of U.S. patent application Ser. No. 10/068,924, filed Feb. 8, 2002, entitled "A Sealable Food Container with Improved Lidding and Stacking Features" now U.S. Pat. No. 7,258,905, which was a continuation-in-part of U.S. patent application Ser. No. 09/921,264, entitled "Disposable Serving Plate With Sidewall-Engaged Sealing Cover", filed Aug. 2, 2001, now U.S. Pat. No. 6,733,852. U.S. patent application Ser. No. 09/921,264 was based on Provisional Application No. 60/223,209, filed Aug. 4, 2000 of the same title. The priority of the foregoing applications is hereby claimed.

BACKGROUND

Disposable lids are generally employed in connection with disposable plates, platters, bowls and the like items; perhaps most typically such plates, platters and bowls are made of paper, plastic or foil. Since it is highly desirable to make disposable lids as lightweight as possible, lid rigidity and especially crush-resistance are frequently product issues. Likewise, while it is desirable to have a leak-proof seal between a container base and lid, the seal geometry must be such that the lid can be easily secured to the base and easily removed without spillage or undue effort. The present invention containers and lid have a variable engagement profile in order to achieve these ends. Before turning to a discussion of the invention, the following patents are noted.

U.S. Pat. No. 6,733,852 to Littlejohn et al. discloses a disposable serving plate with a sidewall-engaged sealing cover. In a preferred construction a plate includes a substantially planar central area, a plate sidewall extending outwardly and upwardly from the central area, a recessed sealing area and a container base stop ridge adjacent the sealing area. A convex outwardly extending rim adjoins the base stop ridge and has an outer lip or border formed thereabout. A resilient mating domed lid is fitted to the plate.

U.S. Pat. No. 6,440,509 also to Littlejohn et al. discloses a compartmented disposable plate with asymmetric rib geometry. The three compartment, disposable serving plate includes three ribs in an asymmetric array angularly joined to the bottom and sidewall of the plate. The plate exhibits remarkable strength and is preferably thermoformed from a plastic material such as mica-filled polypropylene.

Other art related to compartmented containers, including covered and disposable compartmented containers includes the following: U.S. Pat. No. 5,915,581 to Pfirrmann, Jr. et al.; U.S. Pat. No. 3,107,027 to Hong; U.S. Pat. No. 3,633,785 to Cyr et al. Of the foregoing patents, U.S. Pat. No. 5,915,581 is perhaps of particular interest. The '581 patent discloses a two-piece container including a plate having a peripheral rim and a cover with a peripheral flange. The flange of the cover has a rim portion adapted to overlappingly engage the rim of the plate in a releasable interlocking relationship. To facilitate alignment of the cover and the plate an indexing protrusion is configured to engage an indexing cut out of the cover. The cover has a top wall provided with a depending divider for defining compartments corresponding to compartments of the plate. Still further art relating to compartmented containers includes the following United States Patents: U.S. Pat. No. 3,303,964 to Luker, U.S. Pat. No. 3,938,688 to Ryan; U.S. Pat. No. 4,874,083 to Antoni et al. and U.S. Pat. No. 6,595,366 to Brown.

SUMMARY OF THE INVENTION

There is provided in accordance with one aspect of the invention a crush-resistant domed lid for a food container including: a) a dome portion with a top wall and a sidewall; b) a flange portion extending outwardly away from a lower portion of the sidewall; and c) a tab portion extending outwardly from the flange. The flange portion is provided with a rim having a variable profile around the rim characterized in that: i) the rim is provided with a securing undercut portion extending around the majority of its periphery adapted to secure the lid to an outer border of a food container; and ii) the rim has a pair of relatively passive engagement profile portions on either side of the tab extending to the securing undercut portion of the rim. The passive engagement profile portions are configured so that they are undercut less than the securing undercut portion of the lid, thereby facilitating engagement of the lid with, or removal of the lid from, a food container to which the lid is attached. Generally each of the passive engagement portions of the rim have a length of from about 5 to 20% of the circumference of the rim. A suitable length for the passive engagement portions of about 10% of the circumference of the undercut rim each is typical.

In one preferred embodiment, the passive engagement portions of the outer rim of the domed lid are not substantially undercut; rather the passive engagement portions are substantially vertical with respect to the top wall of the dome. In preferred embodiments, the securing undercut portion of the rim extends around at least about 55% of the periphery of the rim; such as at least about 60% of the periphery of the rim.

Particular features in preferred embodiments are, for example, wherein the rim is further provided with a pair of undercut locking portions on either side of the tab between the tab and the passive engagement portions of the rim. Another feature is wherein the domed lid is provided with a plurality of outwardly convex sidewall flutes. These flutes provide strength to the lid as will be appreciated from co-pending patent application Ser. No. 10/170,675 entitled "Crush Resistant Disposable Lid" the disclosure of which is incorporated herein by reference. The geometry of a particular embodiment includes a construction wherein the sidewalls have unfluted areas between flutes and wherein the sidewalls have fewer than about 1.85 flutes per inch of circumference of the lid. Another feature in a preferred embodiment is wherein the lid is a compartmented lid.

The lid of the invention may be thermoformed, thermoformed by application of vacuum or thermoformed by a combination of vacuum and pressure from a sheet of thermoplastic material. The lid most typically has a wall caliper of anywhere from about 8 to about 20 mils such as from about 8 to about 15 mils. When the lid is made of polystyrene the lid may have a wall caliper of from about 10 to about 13 mils for example. Alternatively, the lid may be thermoformed from a thermoplastic sheet of polypropylene.

Another aspect of the present invention is a sealing food container with a sidewall seal and a lid with an undercut rim including: a container base member having a substantially planar base central portion, a base sidewall extending upwardly and outwardly therefrom and a base outer flange portion extending outwardly with respect to the base sidewall defining an outer periphery of the container base member. The base sidewall defines an annular base sealing recess disposed between the substantially planar base central portion of the base serving member and the base outer flange portion. In the sidewall there is: (i) an inwardly projecting base stop ridge at an upper extremity of the annular base sealing recess as well as; (ii) a laterally extending internal retaining shelf at a lower extremity of the base sealing recess; and (iii) the sealing recess is further provided with an inwardly facing annular sealing surface at an outer wall thereof. There is provided a domed lid for securing to the container base member including: (iv) a dome portion with a top wall and a sidewall; (v) a lid stop shelf at a lower extremity of the sidewall of the lid configured to cooperate with the retaining shelf of the sealing recess of the base in order to position the lid for engagement with the base; (vi) an outwardly facing lid annular sealing surface outwardly disposed with respect to the lid stop shelf configured to cooperate with the inwardly facing annular sealing surface of the base to provide a sidewall seal when the lid is engaged to the base member; (vii) a flange portion disposed outwardly with respect to the annular sealing surface of the lid; and (viii) a tab portion extending outwardly from the flange. The flange portion is provided with rim having a variable profile around the rim, the rim being adapted to engage with the base around the outer border of the base and being characterized in that: (1) the rim is provided with a securing undercut portion extending around the majority of its periphery adapted to secure the lid to an outer border of the container base member; and (2) the rim has a pair of relatively passive engagement profile portions on either side of the tab, extending to the securing undercut portion of the rim. The passive engagement profile portions of the lid are configured so that they are undercut less than the securing undercut portion of the lid, thereby facilitating engagement of the lid with, or removal of the lid from the container base member. Preferably, the rim of the lid is effective to form a seal with the outer border of the base around at least a majority of the periphery of the container so that the container is double sealed.

Generally, the container base member is formed from a microwavable thermoplastic material such as polypropylene, mineral filled polypropylene, polyesters and mineral filled polyesters. A particularly preferred embodiment is wherein the base member is formed from mineral-filled polypropylene sheet which includes both mica and calcium carbonate. The wall thickness of the container base member may be from about 10 to about 80 mils and optionally consists essentially of from about 40 to about 90% by weight of a polypropylene polymer, from about 10 to about 60% by weight of a mineral filler, from about 1 to about 15% by weight polyethylene up to about 5 weight percent titanium dioxide. There is optionally included in the thermoplastic composition a basic organic or inorganic compound comprising the reaction product of an alkali metal or alkaline earth element with carbonates, phosphates, carboxylic acids as well as alkali metal and alkaline earth metal oxides, hydroxides, ore silicates and basic metal oxides, including mixtures of silicon dioxide with magnesium oxide, as well as mixtures of the foregoing. The base member may have a wall caliper from about 10 to about 50 mils such as from about 12 to about 25 mils.

The laterally extending retaining shelf of the container base member preferably extends outwardly over a base sidewall shelf width of at least about 1% of the characteristic diameter of the base serving member; the laterally extending retaining shelf of the base serving member typically extends outwardly over a base sidewall shelf width of at least about 1.5% of the characteristic diameter of the container base member. In a preferred embodiment, the base outer flange of the container base member has a generally arcuate profile as does the flange portion of the lid. In another preferred embodiment, the lid and base member each have a plurality of compartments such as three compartments.

Another aspect of the present invention is the combination including: a) a compartmented food serving container with a plurality of compartments separated by a plurality of ribs as well as an outer container flange; and b) a segmented dome cover for the container having a plurality of dome segments corresponding to the compartments of the serving container as well as an outer lid flange and a tab extending outwardly therefrom; wherein the lid flange has a rim with a variable profile around the rim characterized in that: (i) the rim is provided with a securing undercut portion extending around the majority of its periphery adapted to secure the lid to an outer border of a food container; and (ii) the rim has a pair of relatively passive engagement profile portions on either side of the tab extending to the securing undercut portion of the rim, the passive engagement profile portions being configured so that they are undercut less than the securing undercut portions of the lid, thereby facilitating engagement of the lid with, or removal of the lid from, the food serving container.

One preferred embodiment is wherein the food container is a three compartment plate with three divider ribs and the lid has three corresponding dome segments and the compartments and dome segments are arranged in an asymmetric geometry. That is to say, the three divider ribs are asymmetrically arranged such that a first included angle between the first and second ribs differs from a second included angle between the second and third ribs and both the first and second included angles differ from a third included angle between the first and third ribs and the three compartments are of different volume.

Further features and advantages of the present invention will become readily apparent from the following drawings and detailed description.

BRIEF DESCRIPTION OF DRAWINGS

The invention is described in detail below with reference to the various figures. In the Figures.

DETAIL DESCRIPTION

Figure 1:
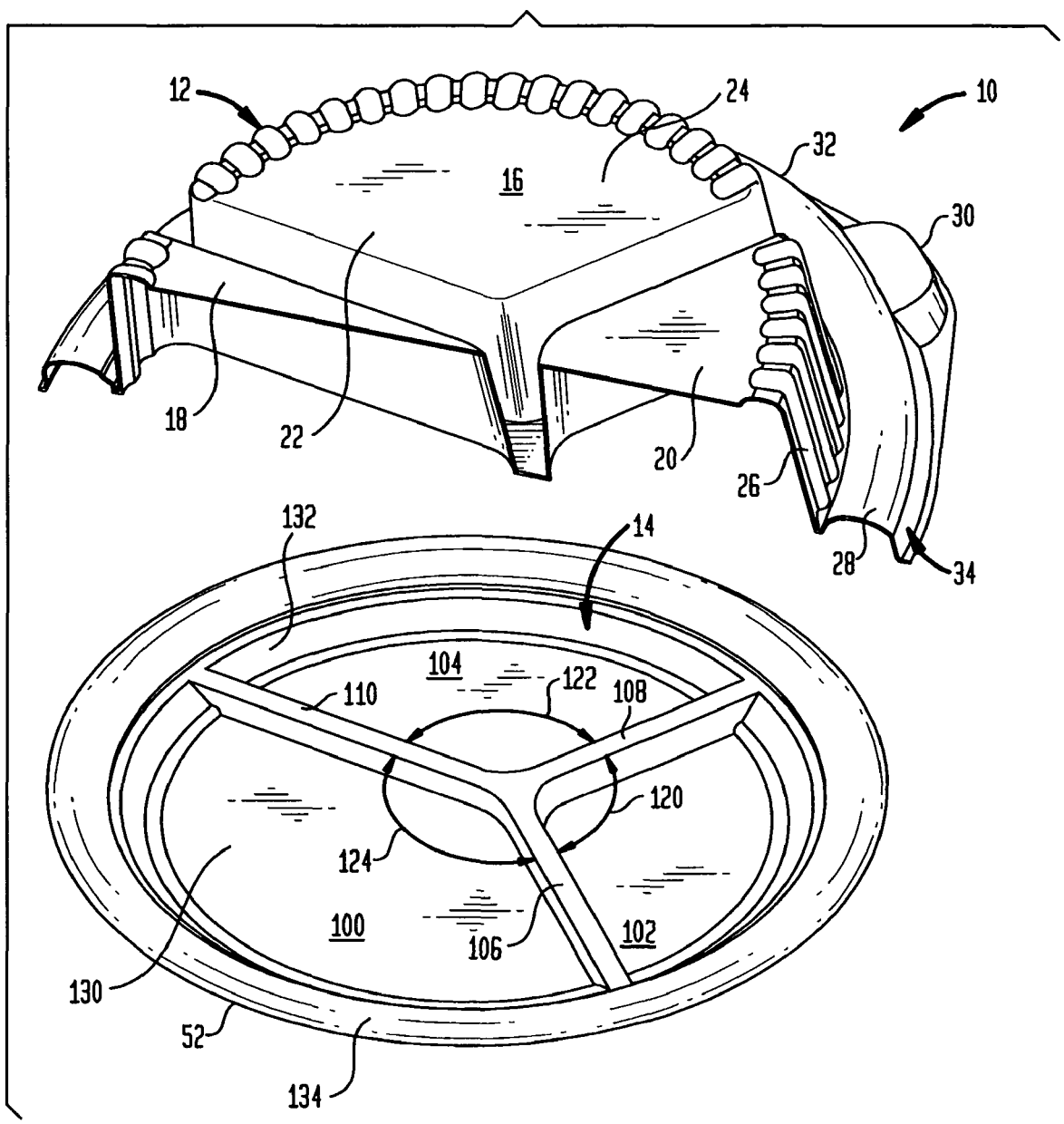
FIG. 1 is an exploded perspective, partially in section, of a disposable food container configured in accordance with the present invention.

The invention is described in detail below with reference to the various figures. Modifications within the spirit and scope of the present invention, set forth in the appended claims, will be readily apparent to those of skill in the art. As used herein terminology has its ordinary meaning. Exemplary definitions used in the specification and claims appear immediately below.

"Dome" refers to an inverted bowl type structure with a sidewall and a topwall. It also refers to segmented dome structures.

"Majority" means more than 50% of a quantity. The majority of the circumference means more than 50% of the circumferential length of an article or portion thereof.

"Mils" means thousandths of an inch.

"Percent" refers to weight percent and so forth unless a different meaning is apparent.

"Rim" as used in connection with the lids of the invention refers to that portion of the lid flange adapted to engage the outer border of a container base and secure the lid to the base at the lids' outer flange. The periphery of the rim and like references are used interchangeably with rim circumference for circular lids.

"Thermoforming", "thermoformed" and like terminology is likewise given its ordinary meaning. In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap. In some preferred embodiments, the melt-compounded composition from which the articles are made may include polypropylene and optionally further includes a polyethylene component and titanium dioxide. Suitable materials and techniques for fabricating the disposable containers of the present invention from thermoplastic materials appear in U.S. Pat. No. 6,211,501 to McCarthy et al. as well as U.S. Pat. No. 6,211,500 to Cochran II et al. the disclosures of which are incorporated herein by reference.

"Undercut" and like terminology refers to the profile of a part having a recess, groove or wall which extends laterally under (or over) a portion of the same part. The "draft" of a thermoformed part may be thought of in the case of a (female) mold as the difference between the upper lateral span of a mold cavity and that span below it. A positive draft allows the pattern to be pulled cleanly from the mold; however, undercuts inherently have a negative draft. Articles which are thermoformed must be so designed as to permit the die section to be parted free of the molded articles without undue interference with the surfaces of the articles. Typically, the surfaces of thermoformed articles have a so-called positive "draft" with respect to the direction in which the die sections are moved during parting to insure that there is no interference between the molded article and the interior surfaces of the die sections during parting. Interference between the articles and the dies is commonly known as "negative draft" and occurs when undercuts are molded into a part. In the present invention, the undercut depth or distance of the lid rim required to secure the lid to a container base is preferably kept to a minimum.

"Unfluted" when used to describe a dome sidewall means the unfluted portion has a curvature equal to or less than the curvature of the dome sidewall generally.

"Wall caliper", "caliper" or like terminology refers to the wall thickness of a lid or container base. For thermoformed lids or containers, the wall caliper means the thickness of the thermoplastic sheet from which the container was made and is inherently a structural feature of the product.

Typical materials for the lids of the invention include polystyrene containing compositions, oriented polystyrene sheet and the like as well as thermoplastic materials comprising polypropylene. The lids are preferably thermoformed.

A particularly preferred material for a bowl, plate or platter is mica-filled polypropylene, optionally provided with calcium carbonate, polyethylene and titanium dioxide in suitable amounts. A platter, bowl or plate of the food container of the present invention may be produced utilizing polymeric compositions filled with conventional inorganic fillers such as talc, mica, wollastonite and the like, wherein the polymer component is, for example, a polyester, a polystyrene homopolymer or copolymer, a polyolefin or one or more of the polymers noted above. While any suitable polymer may be used, polypropylene polymers which are suitable for the plate, bowl or platter are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In some preferred embodiments, the melt-compounded composition from which the articles are made may include polypropylene and optionally further includes a polyethylene component and titanium dioxide. A polyethylene polymer or component may be any suitable polyethylene such as HDPE, LDPE, MDPE, LLDPE or mixtures thereof and may be melt-blended with polypropylene if so desired.

The various polyethylene polymers referred to herein are described at length in the *Encyclopedia of Polymer Science & Engineering* (2d Ed.), Vol. 6; pp: 383-522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

Typically, in filled plastics useful for making the plate or container base of the food container the primary mineral filler is mica, talc, kaolin, bentonite, wollastonite, milled glass fiber, glass beads (solid or hollow), silica, or silicon carbide whiskers or mixtures thereof. We have discovered that polypropylene may be melt-compounded with acidic-type minerals such as mica, as well as inorganic materials and/or basic materials such as calcium carbonate. Other fillers include talc, barium sulfate, calcium sulfate, magnesium sulfate, clays, glass, dolomite, alumina, ceramics, calcium carbonate, silica, pigments such as titanium dioxide based pigments and so on. Many of these materials are enumerated in the *Encyclopedia of Materials Science and Engineering*, Vol. #3, pp. 1745-1759, MIT Press, Cambridge, Mass. (1986), the disclosure of which is incorporated herein by reference. Combinations of fillers are preferred in some embodiments.

Mineral fillers are sometimes referred to by their chemical names. Kaolins, for example, are hydrous alumino silicates, while feldspar is an anhydrous alkalialumino silicate. Bentonite is usually an aluminum silicate clay and talc is hydrated magnesium silicate. Glass, or fillers based on silicon dioxide may be natural or synthetic silicas. Wollastonite is a calcium metasilicate whereas mica is a potassium alumino silicate. Clays may be employed as a primary filler; the two most common of which are kaolin and bentonite. Kaolin refers generally to minerals including kaolinite which is a hydrated aluminum silicate ($Al_2O_3.2SiO_2.2H_2O$) and is the major clay mineral component in the rock kaolin. Kaolin is also a group name for the minerals kaolinite, macrite, dickite and halloysite. Bentonite refers to hydrated sodium, calcium, iron, magnesium, and aluminum silicates known as montmorillonites which are also sometimes referred to as smectites.

Fillers commonly include: barium salt; barium ferrite; barium sulfate; carbon/coke powder; calcium fluoride; calcium sulfate; carbon black; calcium carbonate; ceramic powder; chopped glass; clay; continuous glass; glass bead; glass fiber; glass fabric; glass flake; glass mat; graphite powder; glass sphere; glass tape; milled glass; mica; molybdenum disulfide; silica; short glass; talc; whisker. Particulate fillers, besides mica, commonly include: glass; calcium carbonate; alumina; beryllium oxide; magnesium carbonate; titanium dioxide; zinc oxide; zirconia; hydrated alumina; antimony oxide; silica; silicates; barium ferrite; barium sulphate; molybdenum disulfide; silicon carbide; potassium titanate; clays. Fibrous fillers are commonly: whiskers; glass; mineral wool; calcium sulphate; potassium titanate; boron; alumina; sodium aluminum hydroxy carbonate.

As noted above, a mica and calcium carbonate-filled polypropylene polymer composition is particularly preferred for forming the base (bowl or plate) portion of the container.

Referring to FIGS. 1 through 9, there is illustrated a lidded container 10 configured in accordance with the present invention. Container 10 includes a domed lid 12 as well as a plate 14. The lid has a dome portion 16 having a first dome segment 18, a second dome segment 20, and a third dome segment 22. The dome segments define generally a top wall 24 and a sidewall 26. See FIGS. 1 and 2.

Sidewall 26 extends downwardly to a flange portion 28 which extends outwardly. There is further provided a tab 30 which is used to secure and remove lid 12 to plate 14. Tab 30 defines an upward cavity 31 for ease of gripping the lid with a finger in order to remove the lid from a base.

Flange portion 28 of lid 12 includes a rim 32 having a variable profile around the circumference 34 of the rim. That profile includes an undercut portion 36 that extends from 38 to 40 around the circumference of the lid. Also provided is a pair of relatively passive engagement profile portions 42 and 44. The passive engagement portions each have a length of from about 5 to about 20% of the circumference of the rim; typically each have a length of about 10% of the circumference of the rim. On either side of the tab, there is also provided a locking undercut portion at 46 and 48 having substantially the same profile as undercut rim portion 36.

The variable profile of the rim of the lid is perhaps best understood by reference to FIGS. 2A and 3-7.

Figure 2:
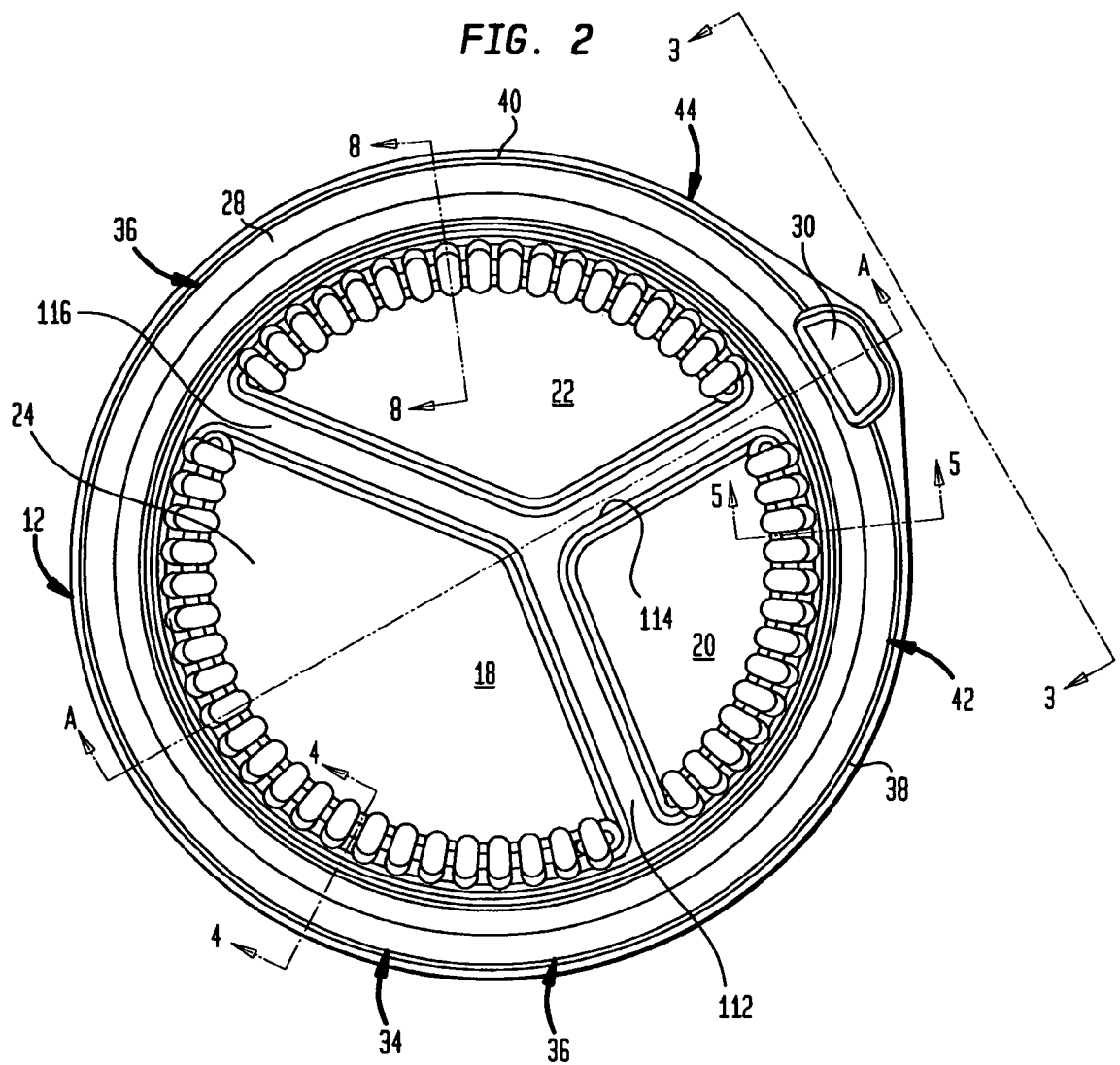
FIG. 2 is a top view of the lid of the container of FIG. 1.
Figure 3:
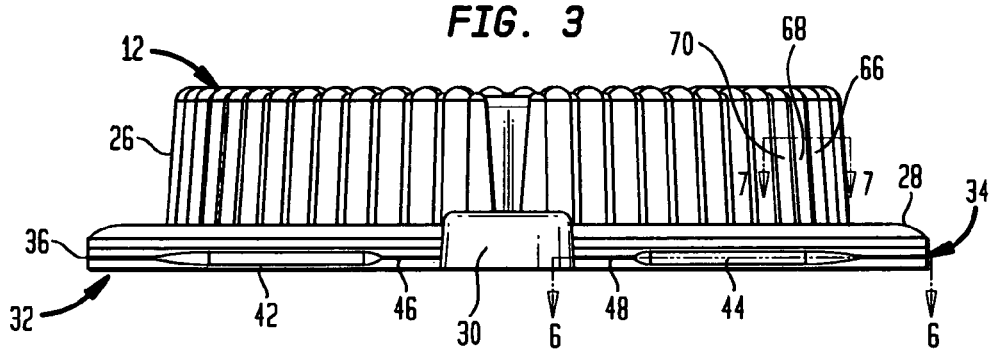
FIG. 3 is a side view along line 3-3 of FIG. 2 of the lid of FIGS. 1 and 2.
Figure 2A:
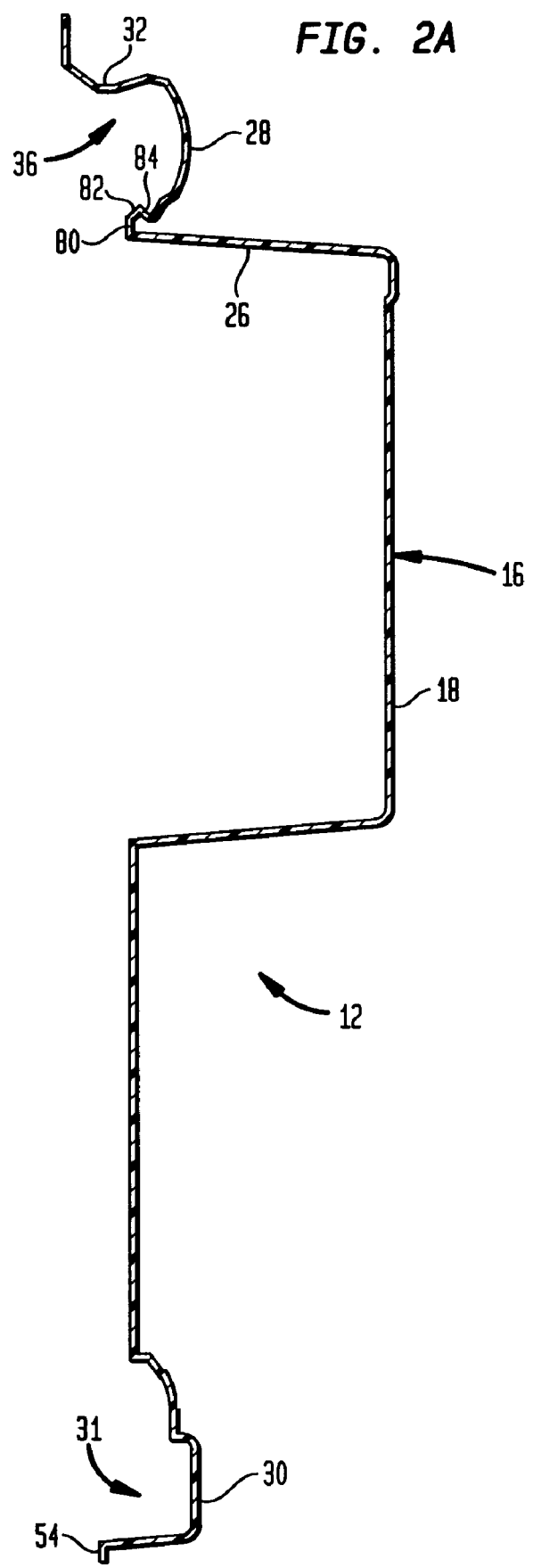
FIG. 2A is a lid profile along line A-A of FIG. 2.

FIG. 3 is a side view of the lid shown in FIGS. 1 and 2, as will be appreciated from the Figure. The lid has a fluted sidewall, including a plurality of outwardly convex flutes which are spaced apart by unfluted portions as will be discussed further below. The rim profile is specifically illustrated in FIGS. 4 through 7.

Figure 4:
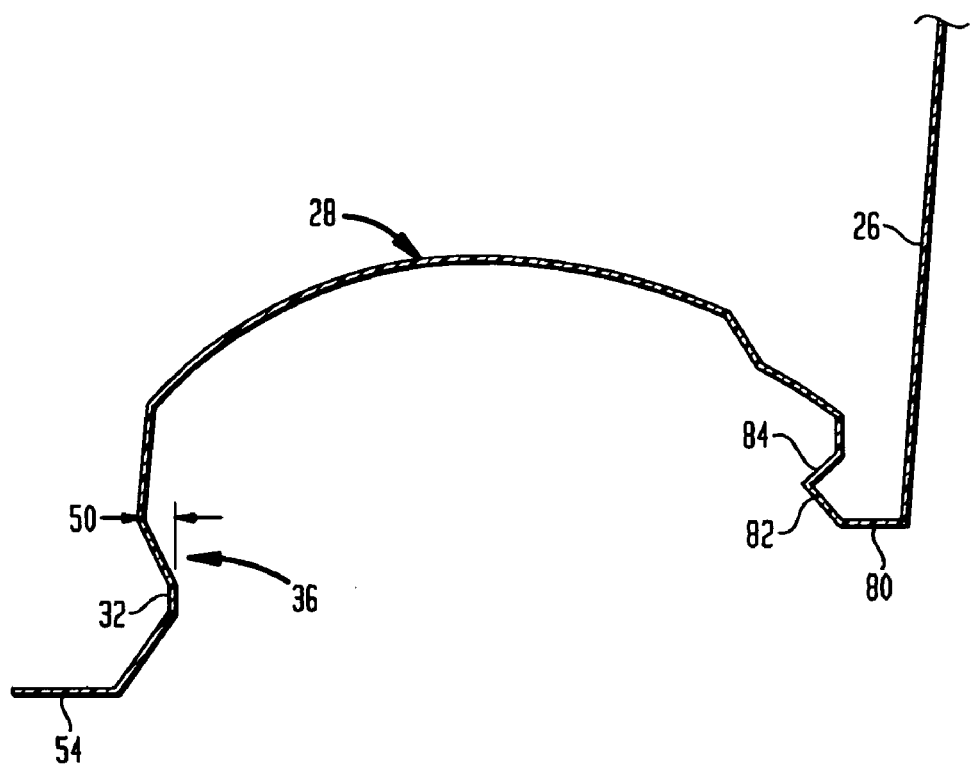
FIG. 4 is an enlarged schematic detail showing the profile of the outer rim of the lid of FIGS. 1, 2 and 3 along line 4-4 of FIG. 2.

FIG. 4 is a schematic sectional view along line 4-4 of FIG. 2 showing the profile from the sidewall outward of lid 12. Flange 28 extends downwardly to rim 32 which is undercut an undercut distance 50 in undercut portion 36 of rim 32 in order to engage an outer edge 52 of plate 14. Undercut portion 36 of the lid extends around the majority (more than 50%) of the circumference of rim 32. Note that the flange extends downwardly from the rim and may optionally include an outer skirt 54.

Figure 5:
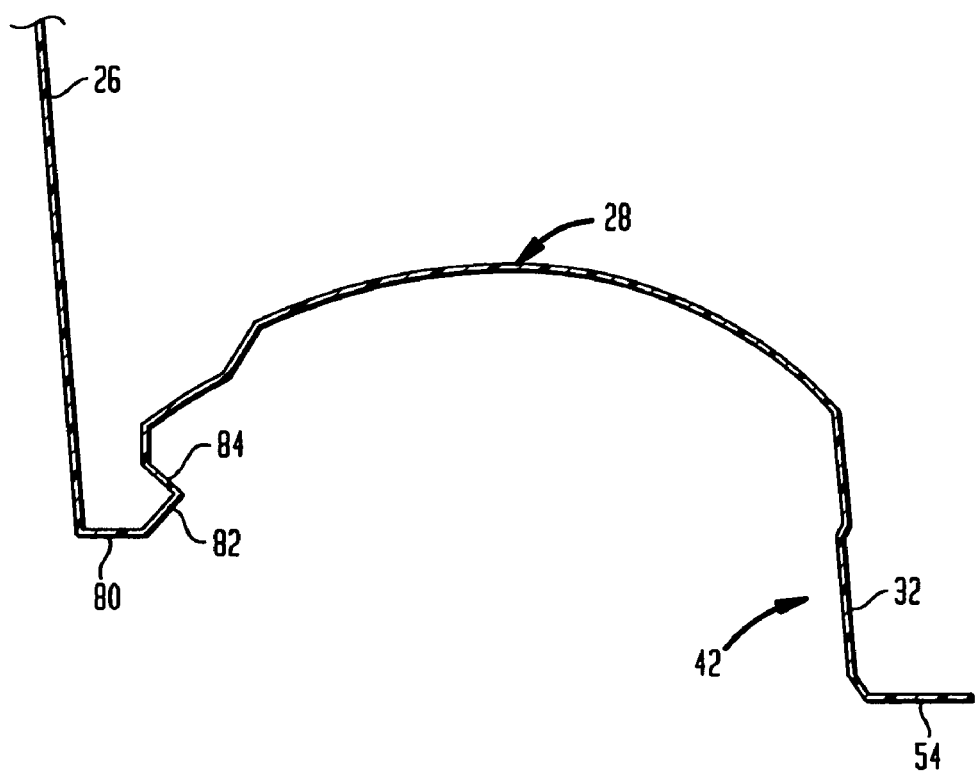
FIG. 5 is an enlarged schematic detail showing the profile of the outer portion of the lid of FIGS. 1, 2 and 3 along line 5-5 of FIG. 2.

FIG. 5 is a view along line 5-5 of FIG. 2 showing the profile of passive portion 42 of the rim of lid 12. It will be appreciated from the diagram that flange 28 extends outwardly and then downwardly at rim 32 to skirt 54. Here, there is very little undercut to the rim.

Figure 6:
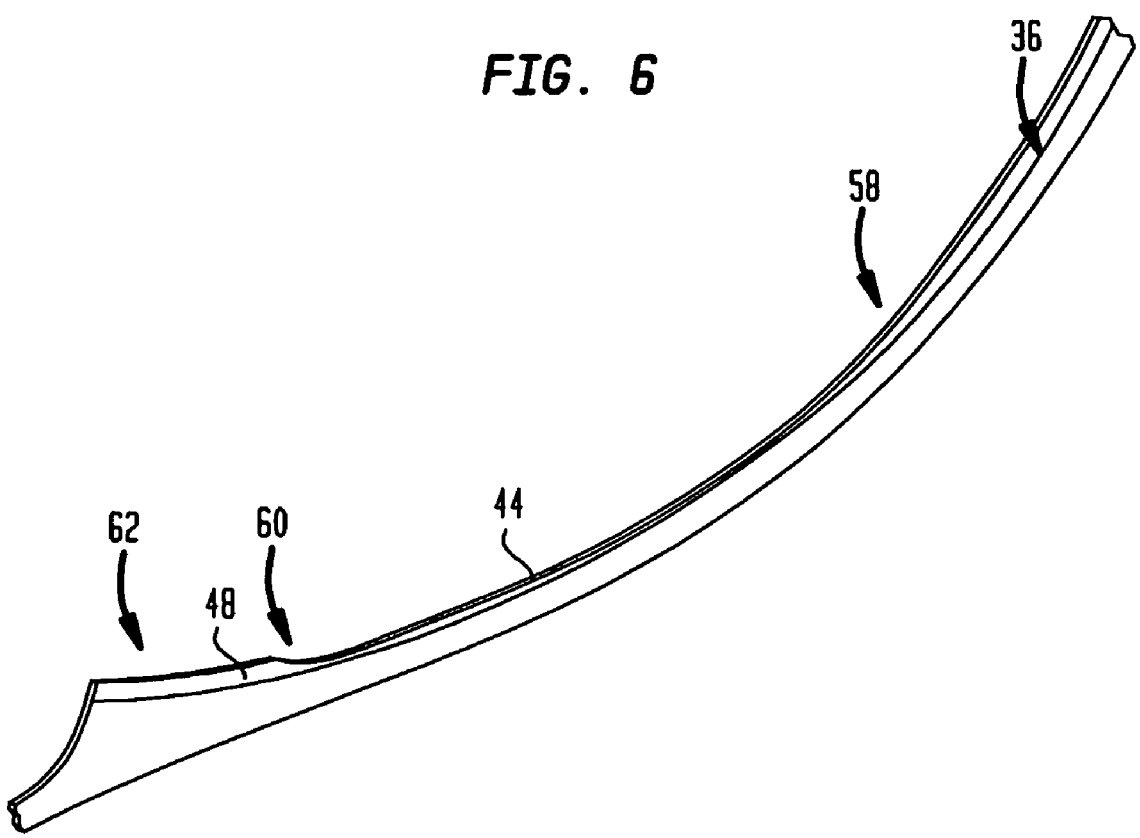
FIG. 6 is an enlarged schematic detail illustrating the geometry of the lid in the vicinity of the tab as seen along line 6-6 in FIG. 3.

The transition from the locking undercut portion 48 to passive engagement portion 44 and back to more deeply undercut rim portion 36 is further appreciated by reference to FIGS. 3 and 6. In FIG. 6, it is seen that undercut rim portion 36 transitions at 58 to passive portion 44, which in turn transitions at 60 to locking portion 48. This geometry is shown schematically in FIG. 6 which is a view in section along line 6-6 looking downward from the top of lid 12, that is looking to skirt 54. Here it is seen at an inward portion 62 of the lid near tab 30 that the lid has a significant undercut at locking portion 48. However, passive engagement portion 44 has either very little or substantially no undercut over its length. Passive portions are not substantially undercut, for example, if they are undercut a distance of about 10 percent or less than the undercut distance 50 of undercut portion 36. At transition 58 the passive portion transitions to a significant undercut rim portion 36 as shown best in FIG. 6.

Generally undercut rim 36 is undercut a distance 50 (FIG. 4) of from about 5 to about 25 mils along the majority of its length.

Figure 7:
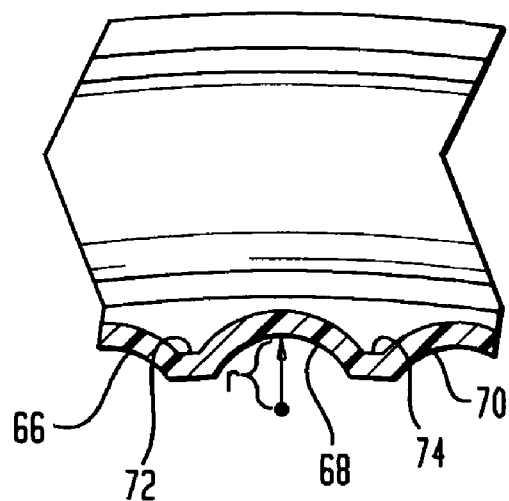
FIG. 7 is a schematic detail along line 7-7 of FIG. 3 illustrating the flute geometry of the lid.
Figure 8:
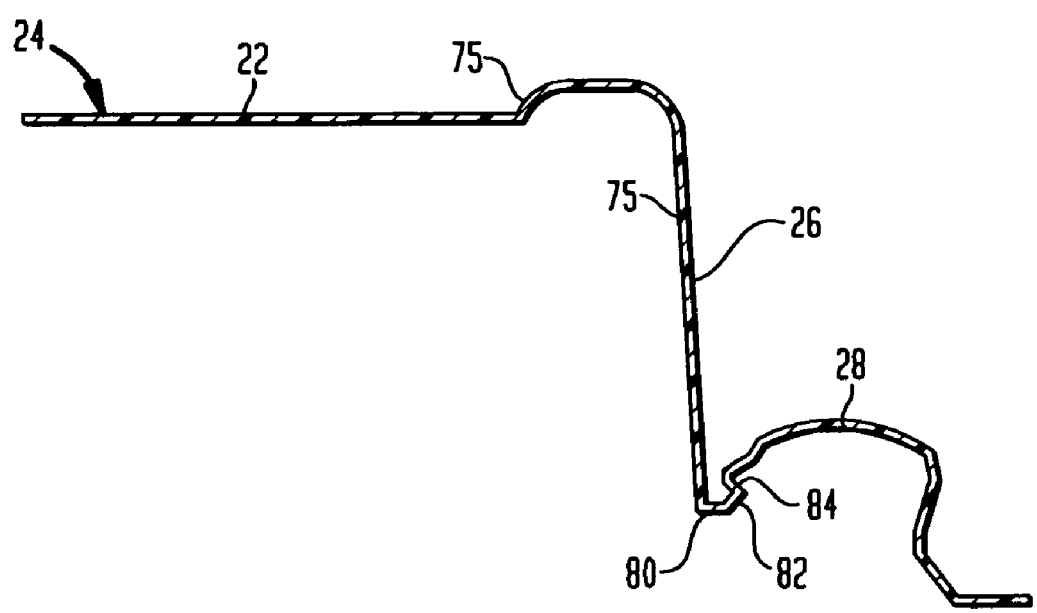
FIG. 8 is a schematic detail along line 8-8 of FIG. 2 illustrating the profile from center of the lid.
Figure 9:
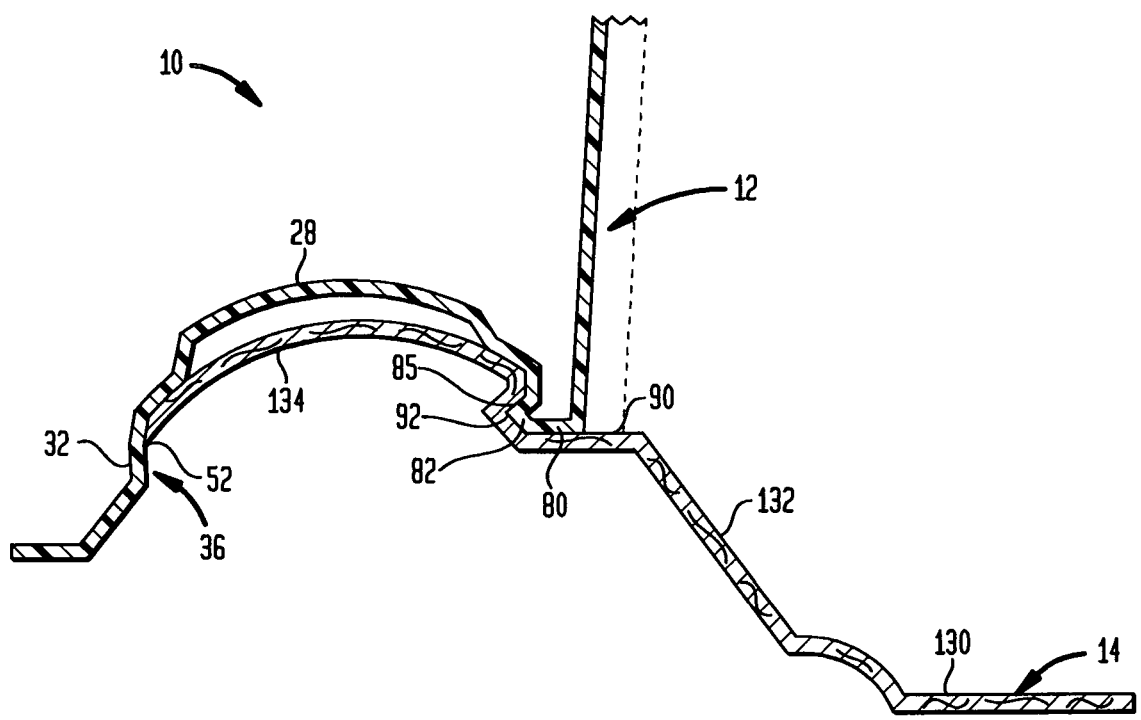
FIG. 9 is a schematic detail illustrating the profile of the lid and base in the vicinity of the retaining shelf.

The geometry of the inventive lid and cooperation with plate 12 is illustrated further in FIGS. 7 through 9.

FIG. 7 is a schematic view in partial section along line 7-7 of FIG. 3. It will be appreciated from FIG. 3 that lid 12 has a plurality of flutes such as flutes 66, 68 and 70 extending over on the sidewalls of dome segments 18, 20 and 22. Each flute has a radius of curvature r of about 3/16 inch or so the flutes being about 80 mils deep. Moreover, the flutes are separated by a plurality of unfluted portions 72, 74 between fluted portions.

FIG. 8 is a profile along line 8-8 of the lid of FIG. 2 showing the profile from the rim toward the center. Here it is seen that the top wall 24 transitions to a flute 75 which in turn transitions to a stop shelf 80 which transitions in turn to a sealing surface 82 adjacent a stop ridge 84. Thereafter flange 28 extends outwardly as shown in FIGS. 1 through 6, for example.

Plate 14 also has a stop ridge 85 positioned to cooperate with stop ridge 84 of the lid. There is shown in FIG. 9 a schematic profile showing the cooperation of lid 12 and plate 14 to define a double sealed container 10. Plate 14 has a retaining shelf 90 upon which the lid stop shelf 80 is placed in order to position the container. When the lid is forced downwardly, the annular sealing surface 82 cooperates with another annular sealing surface 92 disposed in plate 14 that is, an inwardly facing annular sealing surface, to provide a sidewall seal. A flange 28 of the lid extends outwardly so that locking undercut portion 36 engages outer border 52 of plate 14 to provide an outward seal. Note that plate 14 has an arcuate outer flange 134 which corresponds to the profile of flange 28 of lid 12 to provide a more pleasing appearance for the container.

Plate 14 generally has the geometry shown in U.S. Pat. No. 6,440,509 of Littlejohn et al. Plate 14 has a first compartment 100, a second compartment 102, and a third compartment 104. The compartments are separated by a first divider rib 106, a second divider rib 108 and a third divider rib 110. The divider ribs generally have a geometry matching the portion of the domed lid between dome segments as will be appreciated from the Figures. That is to say, the divider ribs correspond to dome divider segments 112, 114, and 116.

As will be appreciated from the '509 patent, most preferred is an asymmetric geometry for the plate wherein an angle 120 between ribs 106 and 108 is different than an angle 122 between divider ribs 108 and 110. A third angle 124 between ribs 110 and 106 is different from both angles 120 and 122. By virtue of this geometry, the product tends not to hinge and has higher stiffness.

Note that plate 14 has generally a substantially planar central bottom portion 130, a sidewall 132 extending outwardly therefrom and a base outer flange 134. Most preferably outer flange 134 has an arcuate shape as shown.

With respect to lid 12, it is preferred to have a relatively low number of flutes, less than 1.85 flutes per inch of circumference of the rim of the lid. For purposes of convenience the circumference is measured at the flange of the lid where it is configured to engage the outer border of a container base; i.e., at undercut portion 36 at passive engagement portions 42, 44 as well as portions 30, 46 and 48. The number of flutes per inch of lid rim circumference is an important feature for crush resistance as is seen in U.S. patent application Ser. No. 10/170,675 noted above. Crush resistance improvement of 20-30% and more is readily achieved with less than 1.85 flutes per inch as opposed to lids with more than 2 flutes per inch as is seen in the following data.

Lids with 1.67 flutes per inch of engagement perimeter, those designated Prototype A in Table 1 below had a stiffness of up to about 5 to about 30 percent higher than the lids with slightly more than 2 flutes per inch, those designated Protoype C in the table. The effect of flute geometry and spacing is more pronounced at high deflection because the lids were tested with a "center" probe.

Figure 10:
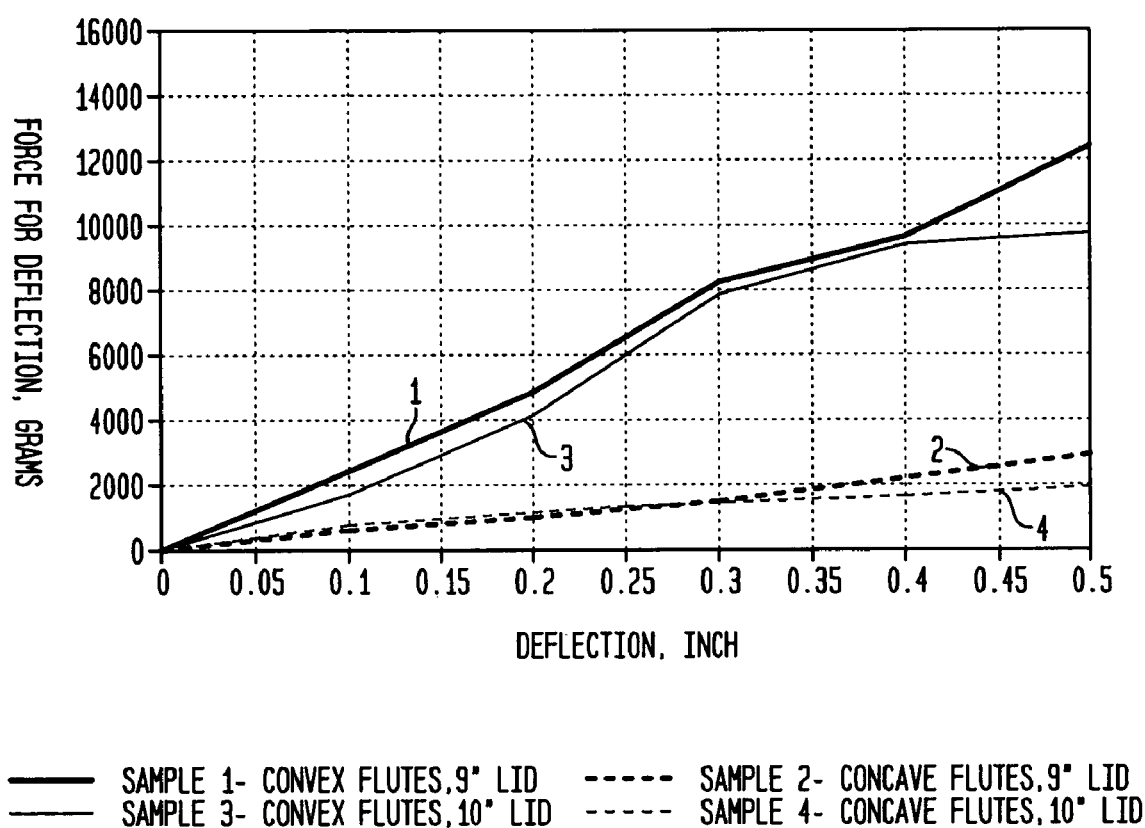
FIG. 10 is a plot comparing crush resistance of various lids.

It is also seen in FIG. 10 that the geometry of the flutes, outwardly convex versus inwardly convex greatly influences crush resistance. The data in FIG. 10 was generated by testing thermoformed lids of like size and weight, the lids with outwardly convex flutes having a slightly higher sidewall than the lids having outwardly concave flutes. The lids tested were otherwise generally identical in design. For the test of FIG. 10, an Instron® tester was fitted with a 1"×11" bar across the center of the lid and the samples were tested by recording the force required at a given compression (deflection in FIG. 10). It can be seen in this series of tests, the lids with outwardly convex flutes resisted compression much more than the conventional designs. For example, at 0.3" of deflection, more than 4 times as much force was required to compress the lids with outwardly convex flutes a like distance. This effect is not seen with a center probe test of the type used in connection with the Table 1 data; it being thus apparent that sidewall effects are observed more readily with a bar type test.

While the invention has been described in detail in connection with one preferred construction of a container of the invention, modifications within the spirit and scope of the invention will be readily apparent to those of skill in the art. In view of the foregoing discussion, relevant knowledge in the art and the applications and references discussed above in connection with the Claim for Priority, Background, Summary of Invention and Detailed Description, the disclosures of which are all incorporated herein by reference, further description is deemed unnecessary.

What is claimed is:

1. A domed lid for a food container comprising:
   (a) a dome with a top wall and a sidewall;
   (b) a flange extending outwardly away from a lower portion of the sidewall and having an inner portion adjacent to the sidewall and an outer portion remote from the sidewall;
   (c) a tab extending outwardly from the flange; and
   (d) a rim disposed in the outer portion of the flange having a variable profile characterized in that:
      (i) the rim has a securing undercut extending around a majority thereof; and
      (ii) the rim has a first substantially vertical passive engagement profile portion disposed adjacent one side of the tab the first substantially vertical passive engagement profile portion extending to a first end of the securing undercut of the rim, and a second substantially vertical passive engagement profile portion disposed on a adjacent the other side of the tab, the second substantially vertical passive engagement profile portion extending to a second end of the securing undercut of the rim, the passive engagement profile

TABLE 1

| Lid | Caliper, mils | Deflection, inches |||||||| 
|---|---|---|---|---|---|---|---|---|---|
| | | 0 | 0.1 | 0.2 | 0.3 | 0.4 | 0.5 | 0.6 | 0.7 |
| | | Force for Deflection, grams |||||||| 
| Prototype A10 | 10 mil | 0 | 573 | 706 | 1007 | 1326 | 1713 | 2004 | 2187 |
| Prototype C10 | 10 mil | 0 | 545 | 675 | 874 | 1096 | 1258 | 1418 | 1547 |
| % more force req. for deflection of "A" | | | | | +13% | +17% | +27% | +29% | +29% |
| Prototype A12.5 | 12.5 mil | 0 | 919 | 1037 | 1348 | 1939 | 2401 | 2928 | 3414 |
| Prototype C12.5 | 12.5 mil | 0 | 819 | 980 | 1321 | 1785 | 2175 | 2476 | 2733 |
| % more force req. for deflection of "A" | | | | | | +8% | +9% | +15% | +20% | portions are undercut, the substantially vertical passive engagement profile portions are undercut a distance of about 10 percent or less of the undercut distance of the securing undercut.

2. The lid according to claim 1, wherein each of the passive engagement profile portions has a length of from about 5% to about 20% of the circumference of the rim.

3. The lid according to claim 1, wherein each of the passive engagement profile portions has a length of about 10% of the circumference of the rim.

4. The lid according to claim 1, wherein the securing undercut of the rim extends around at least about 55% of the periphery of the rim.

5. The lid according to claim 1, wherein the securing undercut of the rim extends around at least about 60% of the periphery of the rim.

6. The lid according to claim 1, wherein the tab defines an upward cavity to facilitate removal of the lid from a food container.

7. The lid according to claim 1, wherein the rim is further provided with a first undercut locking portion between the first side of the tab and the first passive engagement profile portion of the rim and a second undercut locking portion between the second side of the tab and the second passive engagement profile portion of the rim.

8. A sealing food container with a sidewall seal and a lid with an undercut rim comprising:
(a) a container base member having a substantially planar base central portion, a base sidewall extending upwardly and outwardly therefrom and a base outer flange extending outwardly with respect to the base sidewall defining an outer periphery of the container base member;
said base sidewall defining an annular base sealing recess disposed between said substantially planar base central portion of said base serving member and said base outer flange, there being
 (i) an inwardly projecting base stop ridge at an upper extremity of said annular base sealing recess as well as
 (ii) a laterally extending internal retaining shelf at a lower extremity of said base sealing recess;
 (iii) the sealing recess being further provided with an inwardly facing annular sealing surface at an outer wall thereof; and
(b) a domed lid for securing to the container base member including:
 (i) a dome with a top and a sidewall;
 (ii) a lid stop shelf at a lower extremity of the sidewall of the lid configured to cooperate with the retaining shelf of the sealing recess of the base in order to position the lid for engagement with the base;
 (iii) an outwardly facing lid annular sealing surface outwardly disposed with respect to the lid stop shelf configured to cooperate with the inwardly facing annular sealing surface of the base to provide a sidewall seal when the lid is engaged to the shelf member;
 (iv) a flange disposed outwardly with respect to the annular sealing surface of the lid and having an outer portion remote from the annular sealing surface;
 (v) a tab extending outwardly from the flange; and
 (vi) a rim disposed in the outer portion of the flange having a variable profile adapted to engage with the container base member around the outer periphery of the container base member wherein and being characterized in that:
  (1) the rim has a securing undercut extending around a majority thereof; and
  (2) the rim has a first substantially vertical passive engagement profile portion disposed adjacent one side of the tab the first substantially vertical passive engagement profile portion extending to a first end of the securing undercut portion of the rim, and a second substantially vertical passive engagement profile portion disposed adjacent the other side of the tab the second substantially vertical passive engagement profile portion extending to a second end of the securing undercut of the rim, the passive engagement profile portions are undercut, the substantially vertical passive engagement profile portions are undercut a distance of about 10 percent or less of the undercut distance of the securing undercut.

9. The food container according to claim 8, wherein the rim of the lid is effective to form a seal with the outer border of the base around at least a majority of the periphery of the container.

10. The food container according to claim 8, wherein said laterally extending retaining shelf of the container base member extends outwardly over a base sidewall shelf width of at least about 1% of the characteristic diameter of said base serving member.

11. The food container according to claim 8, wherein said laterally extending retaining shelf of said base serving member extends outwardly over a base sidewall shelf width of at least about 1.5% of the characteristic diameter of the container base member.

12. A food container comprising:
(a) a compartmented food serving container with a plurality of compartments separated by a plurality of ribs as well as an outer container flange; and
(b) a segmented dome cover for the container having a plurality of dome segments corresponding to the compartments of the serving container as well as an outer lid flange and a tab extending outwardly therefrom; and a rim disposed on the outer portion of the flange having a variable profile, the rim being characterized in that:
 (i) the rim has a securing undercut extending around a majority thereof; and
 (ii) the rim has a first substantially vertical passive engagement profile portion disposed adjacent one side of the tab the first substantially vertical passive engagement profile portion extending to a first end of the securing undercut, and a second substantially vertical passive engagement profile portion disposed adjacent the other side of the tab the second substantially vertical passive engagement profile portion extending to a second end of the securing undercut, the passive engagement profile portions are undercut, the substantially vertical passive engagement profile portions are undercut a distance of about 10 percent or less of the undercut distance of the securing undercut.

13. The food container according to claim 12, wherein the food container is a three compartment plate with three divider ribs and the lid has three corresponding dome segments.

14. The food container according to claim 13, wherein the three divider ribs are asymmetrically arranged such that a first included angle between the first and second ribs differs from a second included angle between the second and third ribs and both the first and second included angles differ from a third included angle between the first and third ribs and the three compartments are of different volume.

* * * * *